United States Patent [19]
Hayashi

[11] 4,423,714
[45] Jan. 3, 1984

[54] INTERNAL COMBUSTION ENGINE

[75] Inventor: Yoshimasa Hayashi, Kamakura, Japan

[73] Assignee: Nissan Motor Company Limited, Yokohama, Japan

[21] Appl. No.: 266,002

[22] Filed: May 21, 1981

[30] Foreign Application Priority Data

May 23, 1980 [JP] Japan .................. 55-68455

[51] Int. Cl.³ .............................. F02P 5/04
[52] U.S. Cl. .................. 123/407; 123/418; 123/422
[58] Field of Search .......... 123/407, 418, 422, 423, 123/406; 74/860

[56] References Cited

U.S. PATENT DOCUMENTS 3,626,455 12/1971 Toda et al. ................. 123/407
3,718,126 2/1973 Oishi et al. ................. 123/407
3,779,219 12/1973 Saita .......................... 123/423
4,144,860 3/1979 Muranaka et al. .......... 123/407

FOREIGN PATENT DOCUMENTS 2255704 5/1973 Fed. Rep. of Germany .
2373683 7/1978 France .
588637 6/1977 Switzerland .
1407598 9/1975 United Kingdom .

Primary Examiner—Charles J. Myhre
Assistant Examiner—Andrew M. Dolinar
Attorney, Agent, or Firm—Schwartz, Jeffery, Schwaab, Mack, Blumenthal & Koch

[57] ABSTRACT

An internal combustion engine for a vehicle has a first device for generating an ignition signal causing the engine spark plug to fire at a predetermined timing schedule and at retarded timings relative to the predetermined schedule. A second device is provided for detecting all three of (1) a high engine speed condition, (2) a high load operating condition and (3) a condition in which a transmission gear arrangement is in a low speed gear position. The second device produces a signal when all three conditions are satisfied. A third device causes the first device to generate the ignition signal at the retarded timings in response to the signal from the second device, thereby effectively decreasing combustion noise due to a greater combustion pressure rise at low vehicle speeds during high engine speed and load operations.

12 Claims, 4 Drawing Figures

INTERNAL COMBUSTION ENGINE

BACKGROUND OF THE INVENTION

This invention relates to an improvement in an internal combustion engine to decrease total vehicle noise and to obtain the best torque.

It is well known that spark-ignition internal combustion engines are in general so arranged as to advance spark timings of spark plugs as much as possible to the extent that engine knock does not arise so, that air-fuel mixture in each combustion chamber is ignited earlier in the piston cycle to improve combustion in the combustion chamber. This contributes to improvement in fuel economy. However, as the spark timing becomes earlier or more advanced, rising combustion pressure rising characteristics at the initial period of combustion is improved. The rising pressure characteristics is represented by $dp/d\theta$, wherein p is pressure within the combustion chamber, and $\theta$ is crankangle. It is also known that the improved rising combustion pressure characteristics greatly contributes to an increase in combustion noise. With the above-mentioned advanced spark timing, there occurs a high rising combustion pressure characteristic value of 2.5 $Kg/cm^2/deg$ particularly at an engine operation range where engine speed is high and engine load is near full load. As appreciated from the above, the combustion noise of the engine with advanced spark timing is greater and particularly high under engine operating conditions in which engine load is near a full load value.

Even if such combustion noise arises during high speed vehicle cruising, it scarecely contributes to an increase in total vehicle noise, because sound due to vibration from the road surface, wind noise and the like occupy a major part of total vehicle noise during such high speed vehicle cruising. However, it is to be noted that such vibration sound from the road surface, wind noise and the like are not significant during low vehicle speed cruising including rapid acceleration and steep slope uphill cruising under these conditions the rate of combustion noise relative to total vehicle noise is large and therefore increases in combustion noise leads to a noticable overall increase in vehicle noise.

BRIEF SUMMARY OF THE INVENTION

According to the present invention, an internal combustion engine comprises a first device for generating an ignition signal which causes a spark plug to produce a spark, and capable of generating said ignition signal at retarded timings relative to timings dependent on a predetermined schedule. The engine furhter comprises a second device for detecting both a high engine speed and load operating range and a condition where a transmission gear arrangement is in a lower gear position, to produce a signal, and a third device for causing the first device to generate the ignition signal at the retarded timings in response to the signal from the second device. With this arrangement, combustion pressure rise can be effectively suppressed when the transmission gear arrangement is in the low gear position under high engine speed and load operating conditions, so as to decrease combustion noise, thereby decreasing total vehicle noise.

BRIEF DESCRIPTION OF THE DRAWINGS

The features and advantages of the internal combustion engine according to the present invention will be more clearly appreciated from the following description taken in conjunction with the accompanying drawings in which like reference numerals designate like parts and elements, and in which.

DETAILED DESCRIPTION OF THE INVENTION

Figure 1:
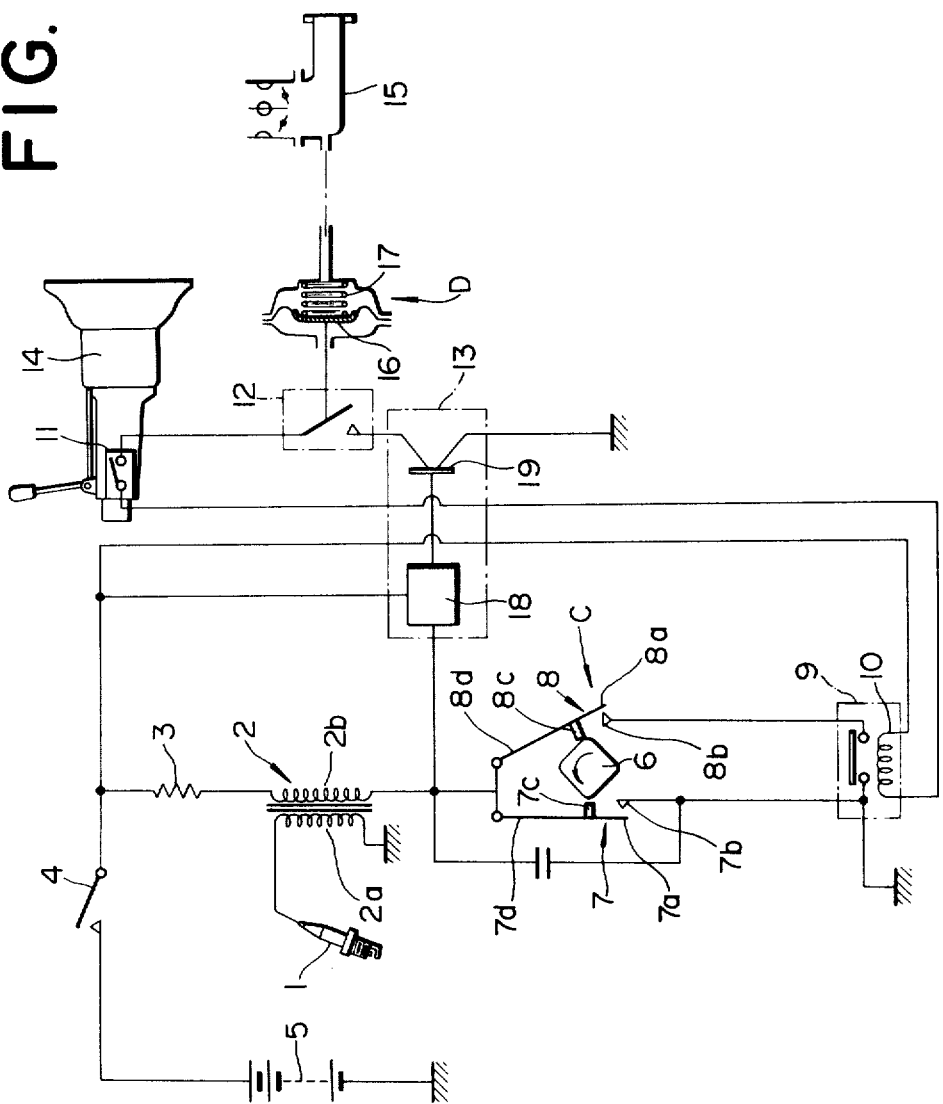
FIG. 1 is a diagrammatic illustration of an ignition system of an embodiment of an internal combustion engine in accordance with the present invention.

Referring now to FIG. 1 of the drawings, there is shown an ignition system of a preferred embodiment of an internal combustion engine in accordance with the present invention. The engine (for example, used for an automotive vehicle) comprises a spark plug 1 disposed in each combustion chamber (not shown) thereof. The spark plug 1 is electrically connected to secondary windings 2a of an ignition coil 2 which has primary windings 2b whose one end is electrically connected through an ignition switch 4 to a battery 5. Another end of the primary windings 2b are electrically connected to a contact breaker C which is equipped with first and second contact points 7 and 8. The first contact point 7 includes a first movable contact point 7a and a first stationary contact point 7b, and the second contact point 8 includes a second movable contact point 8a and a second stationary contact point 8b. The movable contact points 7a and 8a of the first and second contact points 7 and 8 are moved by a rotating cam 6, in which heel portions 7c and 8c of breaker arms 7d, 8d of the first and second contact 7, 8 are hit by cam lobes of the cam 6. In this instance, the contact points 7 and 8 are so constructed and arranged that the contact breaker 8 is operated with a predetermined phase difference relative to the operation of the first contact breaker 7, so that the second contact point remains closed (ON) even when the first contact point 7 is opened (OFF) and immediately thereafter opened (OFF) before the first contact point 7 is closed (ON). This is accomplished by suitably selecting the locations of the heel portions 7c and 8c relative to the cam 6. As shown, the stationary contact of the first contact breaker 7 is directly grounded, whereas the stationary contact of the second contact breaker 8 is grounded though a relay switch 9. The relay switch 9 has a relay coil 10 which is electrically connected in series with a gear position switch 11, an intake vacuum responsive switch 12, and an engine speed responsive switch 13. The relay switch 9 is normally opened (OFF) and arranged to be closed (ON) to allow the second stationary contact 8b to be grounded when electric current is passed through the relay coil 10.

The gear switch 11 is disposed in connection with a gear arrangement (not shown) of a transmission 14 and arranged to be closed (ON) when the gear arrangement is in a lower speed gear position (Low or Second gear position) where a vehicle cruises at a low speed. The intake vacuum responsive switch 12 is arranged to be closed (ON) when a diaphragm 16 of a diaphragm actuator D moves leftward in the drawing by the bias of a spring 17 under a high engine load operating condition where intake vacuum within an intake passage 15 or intake manifold is below a predetermined value. The engine speed responsive switch 13 is so arranged that base current flows in a transistor 19 to establish electrical connection between the collector and the emitter of the transistor to allow the switch 13 to turn ON when an engine speed detector 18 or circuit arrangement generates an electric signal and supplies it to the base of the transistor 19. The engine speed detector 18 is electrically connected to the first contact point 7 which is arranged to supply the engine speed detector 18 with information signals representative of first contact point operation which is in timed relation with engine speed or crankshaft rotation. Accordingly, the engine speed detector 18 is arranged to generate the electric signal when supplied with the information signal representative of an engine speed in access of a predetermined level.

With the above-mentioned arrangement, only when the transmission gear arrangement is in the lower speed gear position under an operating condition where the intake vacuum is below the predetermined level and the engine speed is above the predetermined level, all the switches 11, 12 and 13 turn ON to allow electric current to pass through the relay coil 10, so that the relay switch 9 turns ON. On the contrary, even when only one of the switches 11, 12 and 13 is not turned ON, electric current is not passed through the relay coil 10 and therefore the relay switch 9 is maintained OFF. Accordingly, under a high engine speed and high engine load operating condition, when the transmission gear arrangement is not in the lower gear position, i.e. the vehicle is cruising at a relatively high speed, the relay coil 10 is not supplied with electric current so that relay switch 9 is maintained OFF. This does not allow the second stationary contact to be grounded, thereby disabling the second contact point 8 from functioning. Accordingly, the spark plug 1 produces sparks at advanced spark timings which are previously set or scheduled, under the action of the first contact point 7. Such advanced spark timings, as usual, improve rising combustion pressure rising characteristics in the engine, which contributes to an increase in combustion noise. However, at a relatively high vehicle speed operation range, noise due to vibration from the road surface and striking wind sound occupy a major part of total vehicle noise, and therefore decreasing the combustion noise does not greatly contributes to lowering the total vehicle noise. In this regard, it is rather preferable at the high vehicle speed operation range, to achieve fuel consumption improvement and exhaust emission control by advancing the spark timing of the engine.

On the contrary, when the transmission gear arrangement is in the lower speed gear position during high engine speed and high engine load operating conditions, the noise due to vibration from road surface and wind sounds not significant and therefore, the combustion noise occupies a major part of the total vehicle noise. In this regard, under such engine operating conditions, all three switches 11, 12 and 13 are turned ON, so that the relay coil 10 is supplied with electric current to turn the relay switch ON, thereby allowing the stationary contact point 8b of the second contact point 8 to be grounded. At this state, if the first contact point 7 is first turned from ON to OFF, the second contact point 8 remains closed (ON) at this time and therefore the spark plug 1 does not produce a spark. The spark production of the spark plug 1 takes place for the first time at the time point where the second contact point 8 is turned OFF, thereby putting both the first and second contact points 7, 8 OFF. As a result, the spark timings of the spark plug 1 are retarded relative to the spark timing obtained only under the action of the first contact point 7. This lowers the rising combustion pressure characteristics in the engine to decrease the combustion noise, thereby greatly decreasing the total vehicle noise.

Figure 2:
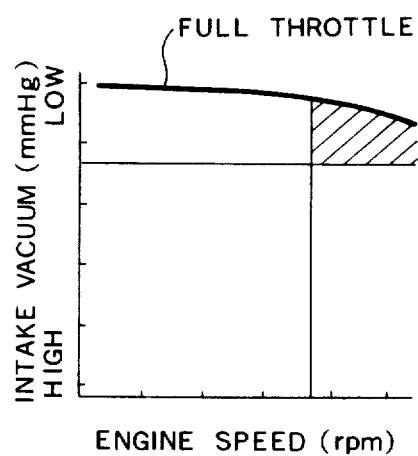
FIG. 2 is a graph showing an example of an engine operating range in connection with the engine of FIG. 1, in terms of intake vacuum and engine speed.

FIG. 2 shows an example of the high engine speed and load operating range (indicated by oblique lines) where both the intake vacuum responsive switch 12 and the engine speed responsive switch 13 are operable or closable, in terms of intake vacuum and engine speed.

Figure 3:
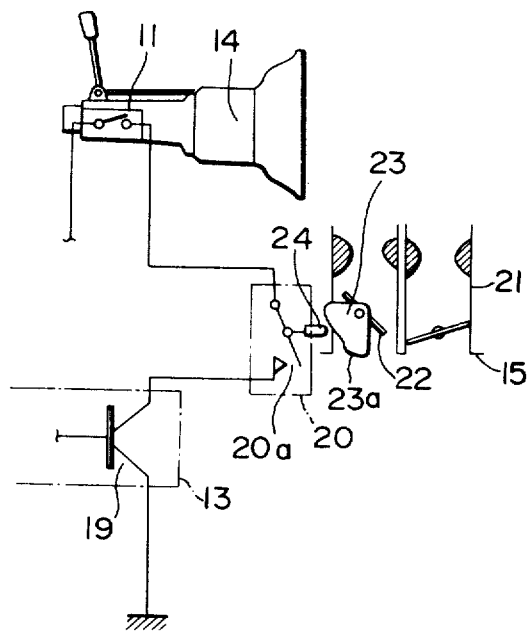
FIG. 3 is a diagrammatic illustration showing a part of an ignition system of another embodiment of the engine in accordance with the present invention.

FIG. 3 illustrates a part of the ignition system of another embodiment of the engine in accordance with the present invention. This embodiment is similar to the embodiment of FIG. 1 with the exception that a throttle position switch 20 is used in place of the intake vacuum reponsive switch 12. Accordingly, in FIG. 3, only the vicinity of the throttle position switch 20 is shown for the purpose of simplicity of illustration. As shown, in this embodiment, a cam 23 is secured to a throttle valve 22 of a carburetor 21 so as to rotate with the throttle valve as a single unit. The throttle position switch 20 includes a contactable member 24 which can be biased leftward in the drawing to close the contact point 20a when pushed by a projecting section 23a of the cam 23. In this instance, the cam 23 is arranged to push the contactable member 24 to close the switch 20 when the opening degree of the throttle valve 22 exceeds a predetermined level.

Figure 4:
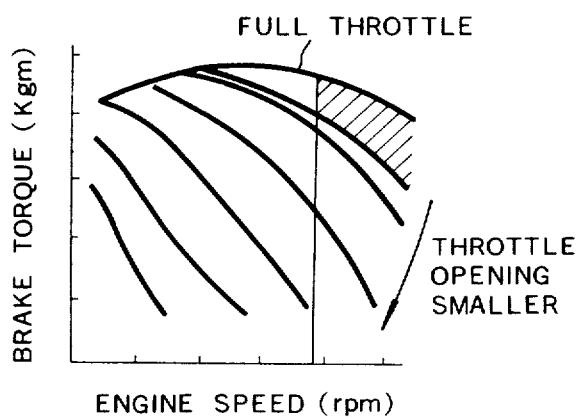
FIG. 4 is a graph showing an example of an engine operating range in connection with the engine of FIG. 3, in terms of brake torque and engine speed.

With this arrangement, within the high engine speed and high engine load operating range indicated by oblique lines in FIG. 4, the throttle position switch 20 and the engine speed responsive switch 13 are simultaneously turned ON. It will be understood that when the gear position switch 11 is turned ON under the high engine speed and load operating condition shown in FIG. 4, the spark timings of the engine can be retarded, thereby decreasing combustion noise.

As appreciated from the above, according to the present invention, the engine is operated at a retarded spark timing when the transmission gear arrangement is in the lower speed gear position, and when the engine is operating at a high engine speed and load operating range. Accordingly, combustion noise can be effectively decreased under engine operating conditions where the combustion noise is predominant in total vehicle noise, thereby achieving an lowering in total vehicle noise.

What is claimed is:

1. An internal combustion engine for a vehicle having a spark plug disposed in each combustion chamber, said engine comprising:
   means for generating an ignition signal which causes the spark plug to produce a spark, said ignition signal generating means being capable of generating said ignition signal at retarded timings relative to timings dependent on a predetermined schedule;
   circuit means for detecting an engine operation range which is conducive to an undesirable level of combustion noise by detecting all of (1) a high engine speed condition, whernever engine speed is higher than a predetermined value, (2) a high engine load operating condition, whenever engine load is higher than a predetermined value, and (3) a condition in which a transmission gear arrangement of said vehicle is in a lower speed gear position, and for generating a signal in response thereto, said engine speed condition being detected independently of said transmission gear condition; and means for decreasing engine combustion noise by causing said ignition signal generating means to generate said ignition signal at said retarded timings in response to said signal from said circuit means.

2. An internal combustion engine as claimed in claim 1, wherein said ignition signal generating means includes first ignition signal generating means for generating said ignition signal at said timings dependent on said predetermined schedule, when operated, and second ignition signal generating means for generating said ignition signal at said retarded timings, when operated.

3. An internal combustion engine as claimed in claim 2, wherein said causing means includes switching means for operating said second ignition signal generating means when supplied with said signal from said circuit means.

4. An internal combustion engine as claimed in claim 3, wherein said first and second ignition signal generating means are first and second contact point arrangements, respectively, which are electrically connected with each other through an ignition coil with the spark plug.

5. An internal combustion engine as claimed in claim 4, wherein said switching means is a relay switch for allowing electric current to flow through said second contact point arrangement, when supplied with electric current.

6. An internal combustion engine as claimed in claim 5, wherein said circuit means includes an engine speed responsive switch which is closed when engine speed is above a predetermined level, an engine load responsive switch which is closed when engine load is above a predetermined level, and a transmission gear position switch which is closed when said transmission gear arrangement is in said lower speed gear position, said engine speed responsive switch, engine load responsive switch and transmission gear position switch being electrically connected to said relay switch so that electric current is supplied through to said relay switch upon closing of all said switches.

7. An internal combustion engine as claimed in claim 6, wherein said engine speed responsive switch is electrically connected to said first contact point arrangement and closed when the rotating speed of a rotating cam associated with said first contact point is above a predetermined level.

8. An internal combustion engine as claimed in claim 6, wherein said engine load responsive switch is an intake vacuum responsive switch which is closed when intake manifold vacuum is below a predetermined level.

9. An internal combustion engine as claimed in claim 6, wherein said engine load responsive switch is a throttle position switch which is constructed and arranged to be closed when the opening degree of a throttle valve is above a predetermined level.

10. An internal combustion engine for a vehicle having a spark plug disposed in each combustion chamber, said engine comprising:

means for generating an ignition signal which causes the spark plug to produce a spark, said ignition signal generating means being capable of generating said ignition signal at retarded timings relative to timings dependent on a predetermined schedule;

circuit means for detecting an engine operation range which is conducive to an undesirable level of combustion noise by detecting all of (1) an engine speed higher than a predetermined level, (2) an engine load operating condition being higher than a predetermined level, and (3) a condition in which a transmission gear arrangement of said vehicle is in a lower speed gear position, and for producing a signal in response thereto, said engine speed condition being detected independently of said transmission gear condition, said circuit means including an engine speed responsive switch which is closed whenever engine speed is above said predetermined speed level, an engine load responsive switch which is closed whenever engine load is above said predetermined load level, and a transmission gear position switch which is closed when said transmission gear arrangement is in a lower speed gear position; and means for decreasing engine combustion noise by causing said ignition signal generating means to generate said ignition signal at said retarded timings in response to said signal from said circuit means, said causing means including switching means electrically connected in series with said engine speed responsive switch, said engine load responsive switch and said transmission gear position switch, and arranged to cause said ignition signal generating means to generate said ignition signal at said retarded timings in response to the closed condition of said engine speed responsive switch, engine load responsive switch, and transmission gear position switch.

11. An internal combustion engine for a vehicle having a spark plug disposed in each combustion chamber, said engine comprising:

means for generating an ignition signal which causes the spark plug to produce a spark, said ignition signal generating means being capable of generating said ignition signal at retarded timings relative to timings dependent on a predetermined schedule, said ignition signal generating means including first ignition signal generating means for generating said signal at said timings dependent on said predetermined schedule, when operated, and second ignition signal generating means for generating said signal at said retarded timings, when operated, said first and second ignition signal generating means including first and second contact point arrangements, respectively, which are electrically connected with each other and through an ignition coil with the spark plug;

circuit means for detecting an engine operation range which is conducive to an undesirable level of combustion noise by detecting all of (1) an engine speed condition higher than a predetermined level, (2) an engine load operating condition higher than a predetermined level and (3) a condition in which a transmission gear arrangement is in a lower speed gear position, and for producing a signal in response thereto, said engine speed condition being detected independently of said transmission gear condition;

said circuit means including an engine speed responsive switch which is closed whenever engine speed is above said predetermined speed level, an engine load sensor responsive switch which is closed whenever engine load is above said predetermined load level, and a transmission gear position switch which is closed when said transmission gear arrangement is in a lower speed gear position; and
means for decreasing engine combustion noise by causing said ignition signal generating means to generate said ignition signal at said retarded timings in response to said signal from said circuit means, said causing means including switching means for operating said second ignition signal generating means when supplied with said signal from said detecting means, said switching means including a relay switch for allowing electric current to flow through said second contact point arrangement, when supplied with electric current, said relay switch being electrically connected in series with said engine speed responsive switch, engine load responsive switch and transmission gear position switch so that electric current is supplied to said relay switch upon closing of all said switches.

12. A method of reducing engine combustion noise in an automotive vehicle comprising the steps of:
  (a) generating ignition signals in accordance with a predetermined timing schedule,
  (b) detecting an engine operation range which is conducive to an undesirable level of combustion noise by detecting all of:
    (1) a condition in which a transmission gear arrangement of said vehicle is in a lower speed gear position,
    (2) engine speed conditions higher than a predetermined level, said engine speed condition detected independently of said transmission gear condition, and
    (3) engine load operating conditions higher than a predetermined level,
  (c) generating a signal in response to simultaneously detecting all of said conditions in step (b), and
  (d) delaying the ignition signal in response to said generated signal whereby engine combustion noise is reduced.

* * * * *